Figure 1:
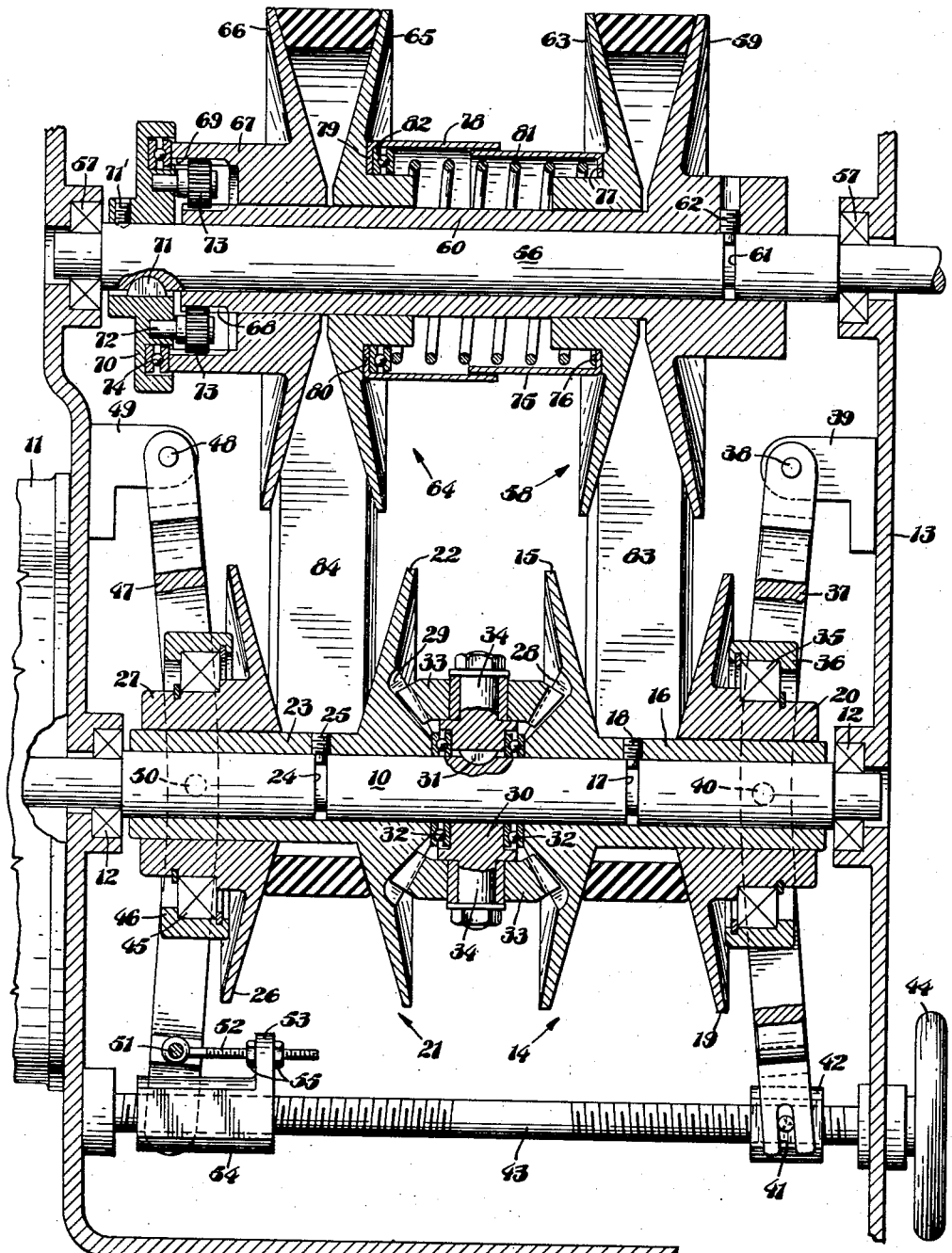

April 22, 1958

J. S. MICHIE 2,831,358

MULTIPLE BELT, VARIABLE-SPEED TRANSMISSION
WITH DIFFERENTIALLY ASSOCIATED PULLEYS

Filed May 25, 1954

2 Sheets-Sheet 1

INVENTOR.
JOHN S. MICHIE,

BY:
Harold B. Hood.
ATTORNEY.

INVENTOR.
JOHN S. MICHIE,
BY:
Harold B. Hood.
ATTORNEY.

United States Patent Office 2,831,358
Patented Apr. 22, 1958

2,831,358

MULTIPLE BELT, VARIABLE-SPEED TRANSMISSION WITH DIFFERENTIALLY ASSOCIATED PULLEYS

John S. Michie, Columbus, Ind., assignor, by mesne assignments, to The Reliance Electric and Engineering Company, Cleveland, Ohio, a corporation of Delaware Application May 25, 1954, Serial No. 432,073

29 Claims. (Cl. 74—230.17)

The present application relates to a multiple belt, variable-speed transmission with differentially associated pulleys, and the invention is primarily directed to the improvement of the power transmission capacity of multiple belt transmissions of the expansible V-pulley type.

Conventionally, in speed-varying drives of the expansible V-pulley type, the V-belts used are wider than those used in constant-ratio, V-belt drives. It has long been known that the power transmitting efficiency of such a speed varying unit including pairs of expansible V-pulleys connected by such relatively-wide belts of V-cross-section is less than theoretically should be expected. For instance, an empirical formula has been evolved to express the power transmitting capacity of a V-belt of known physical characteristics, in which the variable factors are cross-sectional area of the belt, pitch diameter and angle of inclination of the sides of the belt, and pitch diameter of the pulleys connected by the belt. While this formula applies with considerable accuracy to single V-belt drives between V-pulleys of fixed effective diameters, it has long been known that the actual power transmitting capacity of a transmission including expansible V-pulleys and such wide V-belts is only approximately fifty percent of the capacity indicated by the above formula. It has also long been known that the power transmitting capacity of a transmission having two or more V-pulleys on each of the input and output shafts, each pulley on the input shaft being connected to a pulley on the output shaft by a V-belt, is less than is theoretically indicated by the application of the above formula to the system. The reasons for this conditions have long been a mystery.

I have reached the conclusion that the deficiency of capacity of such transmissions is due, in part, to what may be termed "bucking" between the individual pulley-pair-and-belt units of the multiple belt transmission; and, in part, to "bucking" within the body of each belt, in a variable speed drive of the multiple belt type. Such bucking within the bodies of the belts results, according to my present belief, in part from belt misalignment which inevitably occurs during adjustments in some types of transmissions, and in part from minor inaccuracies in the construction of the transmission parts. Absolute accuracy in the machining of the coned face of a pulley disc to a theoretical angle is, of course, impossible; and when two such discs are used in mating relation it is entirely possible that opposite inaccuracies may occur, at a common pitch diameter of the mating faces of the two discs. In such a situation, of course, it is entirely possible that one side of the belt may ride outside the theoretical pitch diameter while the other side may ride inside the theoretical pitch diameter, thereby multiplying the effect of the inaccuracy in disc face form. In a multiple belt system, of course, such inaccuracies may be further multiplied. Because of such inaccuracies in disc face contour or in belt section, one belt of a multiple belt system may tend to run ahead of the other belt or belts of such system, in which case the lagging belt or belts will, of course, cause a loss of power in the transmission, just as any tendency of one side of a single belt to run ahead of the other side of that belt, creates serious stresses within the belt body, and, necessarily, produces power losses within the system. I am convinced that power losses arising in these ways, are primarily responsible for the failure of such systems to conform to theoretical performance capacity. While these failures have long been recognized, they have not heretofore been cured.

It is the primary object of this invention, then, to improve the power transmission capacity of multiple belt, V-pulley power transmissions, and particularly of such transmissions in which the V-pulleys are expansible, whereby variations in output speed may be attained. A further object of the invention is to provide, in a multiple belt transmission, a differential drive connection between the plural pulleys on each shaft and the shaft upon which those pulleys are mounted.

A still further object of the invention is to provide, in such a transmission, a differential drive connection between the individual discs of each such pulley.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 2:
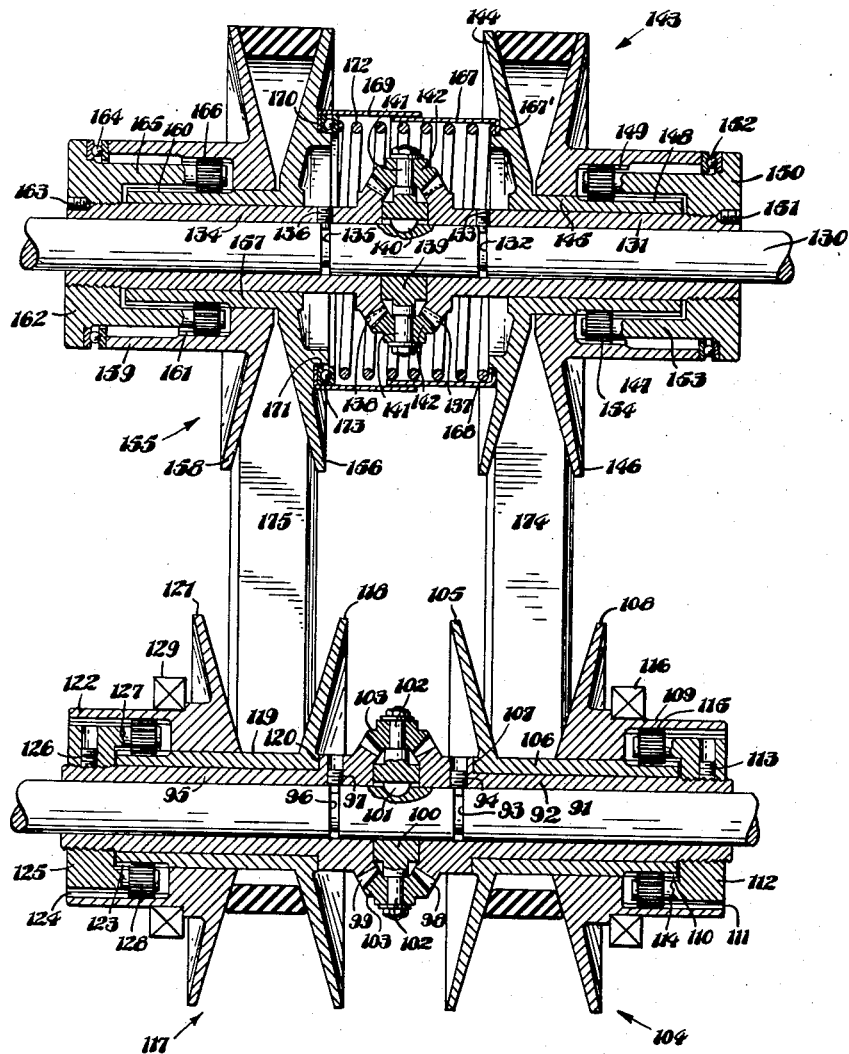

Fig. 1 is a section through a multiple belt, variable speed transmission constructed in accordance with the present invention, conventional and associated parts of the mechanism being shown fragmentarily and more or less diagrammatically; and Fig. 2 is a similar view through a modified embodiment of the invention.

Referring more particularly to Fig. 1, it will be seen that I have shown an input shaft 10 which, as indicated, may be the spindle of an electric motor 11. I have shown the shaft 10 supported in bearings 12, 12 mounted in the opposite walls of a housing indicated by the reference numeral 13.

An expansible V-pulley, indicated generally by the reference numeral 14, includes a coned disc 15 provided with an elongated, coaxial hub 16 projecting from its coned face. Means is provided for holding the disc 15 against axial reciprocatory movement relative to the shaft 10, such means, in the illustrated embodiment, comprising an annular groove 17 in the shaft 10 receiving the reduced nose of a screw 18 penetrating the hub 16 of the disc 15. It will be seen, however, that the disc 15 is free to rotate relative to the shaft 10.

A second coned disc 19 is journalled on the hub 16 in facing relation to the disc 15, said disc 19 being free for coaxial rotational and reciprocatory movement relative to the disc 15, and cooperating with said disc to define an expansible V-pulley. As shown, a hub 20 projects rearwardly from the disc 19 for a purpose later to become apparent.

A second expansible V-pulley is indicated generally by the reference numeral 21 and comprises a disc 22 similar to the disc 15 and journalled on the shaft 10, in back-to-back, axially spaced relation to the disc 15. The disc 21 is provided with an elongated, coaxial hub 23 projecting from its coned face; and means is provided for restraining the disc 22 against axial reciprocatory movement relative to the shaft 10, such means, in the illustrated embodiment, comprising an annular groove 24 receiving the reduced nose of a screw 25 which penetrates the hub 23. The disc 22, likewise, is free for coaxial rotational movement relative to the shaft 10. A fourth coned disc 26 is journalled on the hub 23 in facing relation to the disc 22, and is free for axial reciprocatory movement relative thereto, said disc 26 cooperating with the disc 22 to define an expansible V-pulley. A hub 27 projects rearwardly from the disc 26.

The back of the disc 15 is formed with an annular series of teeth 28 defining a bevelled gear; and the back of the disc 22 is formed with a similar series of teeth 29 defining a bevelled gear. A planetary carrier 30 is fixed to rotate with the shaft 10, and is interposed between the discs 15 and 22. As shown, the carrier 30 is secured to the shaft 10 by means of a Woodruff key 31; and thrust bearings 32, 32 are interposed between the carrier and the respective discs 15, 22. One or more bevelled gears 33 are eccentrically carried by the carrier 30 upon radially projecting studs 34, 34, and said gears mesh with the teeth 28 of the disc 15 and with the teeth 29 of the disc 22, thereby providing a differential drive connection between the shaft 10 and the respective pulleys 14 and 21.

A thrust bearing 35 is supported upon the hub 20 of the disc 19 and preferably, though not necessarily, is held, as shown, against axial movement in either direction relative to the disc 19. Essentially the bearing 35 must be held against relative movement toward the left as viewed in Fig. 1. A bearing housing 36 is associated with the bearing 35; and, in the illustrated embodiment of the invention, a lever 37 is pivoted at 38 upon a bracket 39 carried within the housing 13 and is provided with a yoke portion straddling the bearing housing 36 and pivotally connected thereto by means of pins 40, or the like. The opposite end of the lever 37 is bifurcated, as at 41, to cooperate with one or more pins carried upon a nut 42 threadedly mounted upon a screw shaft 43 journalled in the housing 13 and externally carrying a hand wheel 44. Quite obviously, rotation of the hand wheel 44 will shift the nut 42 axially of the shaft 43 to swing the lever 37 about its pivot 38, thereby shifting the disc 19 toward or away from the disc 15.

Similarly, a bearing 45 is supported upon the hub 27 of the disc 26 and is engaged by a bearing housing 46. A lever 47, pivoted at 48 upon a bracket 49 within the housing 13, has a pivotal connection at 50 with the bearing housing 46. At its distal end, the lever 47 carries a pin 51 upon which is journalled a screw 52 passing through an opening in an ear 53 upon a nut 54 threadedly supported upon the shaft 43. Stop nuts 55 cooperate with the screw 52 to provide for adjustment of the lever 47 relative to the lever 37. The opposite end portions of the shaft 43 are oppositely threaded so that, as the hand wheel 44 is rotated in a direction to shift the lever 37 in a clockwise direction, the lever 47 will be correspondingly shifted in a counter-clockwise direction. Thus, the discs 19 and 26 will be equally and oppositely adjusted, longitudinally of the shaft 10, by rotation of the hand wheel 44.

An output shaft 56 is journalled in bearings 57 carried by the housing 13, upon an axis substantially parallel with the axis of the shaft 10. A third expansible V-pulley, indicated generally by the reference numeral 58, comprises a disc 59 journalled on the shaft 56 and formed with an elongated, coaxial hub 60, as shown. Preferably, means will be provided for restraining the disc 59 against axial reciprocatory movement relative to the shaft 56, and as shown, such means comprises a groove 61 in the shaft 56 receiving the reduced nose of a screw 62 passing through a rearwardly projecting hub on the disc 59. A mating coned disc 63 is journalled on the hub 60 and is free for coaxial reciprocatory movement therealong relative to the disc 59, said disc 63 cooperating with the disc 59 to define the expansible V-pulley 58.

A fourth expansible V-pulley, indicated generally by the reference numeral 64, is supported from the shaft 56 and comprises a coned disc 65 journalled on the hub 60 and free for reciprocatory movement relative thereto, said disc 65 being arranged in back-to-back relation to the disc 63 and being axially spaced therefrom. A further coned disc 66 is journalled on the hub 60 in facing relation to the disc 65, and cooperates with the disc 65 to define the expansible V-pulley 64. The disc 66 is formed with a rearwardly projecting hub 67 which includes a distal portion spaced radially from, and enshrouding, the distal end of the hub 60.

At its distal end, and within the region enshrouded by the radially spaced portion of the hub 67, the hub 60 is formed with an annular series of teeth 68; and the radially spaced, enshrouding portion of the hub 67 is formed with an internal, annular series of teeth 69.

A planetary carrier 70 is fixed to rotate with the shaft 56 beyond the distal ends of the hubs 60 and 67, being secured to the shaft by a Woodruff key 71 and a pointed set screw 71'. Said carrier supports, eccentrically, one or more stub shafts 72, upon each of which is mounted a gear 73, each such gear being disposed between the toothed portions of the hubs 60 and 67 and meshing with the tooth series 68 and with the tooth series 69. Preferably, a thrust bearing 74 is interposed between the carrier 70 and the distal end of the hub 67 to restrain the disc 66 against movement toward the left as viewed in Fig. 1. It will be clear that the carrier 70, with its planetary gears 73, provides a differential driving connection between the shaft 56 and the pulleys 58 and 64.

A tubular shield 75, formed with an inturned toe 76, bearing against a shoulder 77 on the back of the disc 63, cooperates telescopically with a second tubular shield 78 having an inturned toe 79 bearing against a shoulder 80 on the back of the disc 65; and a coiled spring 81 is confined, under compression, within the housing defined by the shields 75 and 78, one end of said spring bearing against the toe 76 and the other end of said spring acting, through the toe 79, against the disc 65. Thus, the spring 81 will be seen to urge the discs 63 and 65, respectively, toward the discs 59 and 66. Preferably, a thrust bearing 82 is interposed between one end of the spring 81 and the adjacent shield toe.

A V-belt 83 provides a driving connection between the pulley 14 and the pulley 58, and a second V-belt 84 provides a driving connection between the pulley 21 and the pulley 64. It will be clear that, as the lower ends of the levers 37 and 47 are moved toward each other, the discs 19 and 26 will be moved, respectively, toward the discs 15 and 22, thereby squeezing the belts 83 and 84 outwardly between the disc pairs to increase the effective diameters of the pulleys 14 and 21; and it will be clear that, as the belts thus move outwardly with respect to the pulleys 14 and 21, they will be drawn more deeply into the pulleys 58 and 64. Since the disc 59 is held, by the screw 62, against axial movement relative to the shaft 56, and since the disc 66 is held by the carrier 70 against movement toward the left, it will be clear that such movements of the belts 83 and 84 will force the discs 63 and 65 respectively away from the discs 59 and 66, thereby compressing the spring 81. If the screw shaft 43 is rotated in the opposite direction, the spring 81 will force the discs 63 and 65 respectively toward the discs 59 and 66 to squeeze the belts 83 and 84 outwardly with respect to the pulleys 58 and 64, thereby drawing them inwardly with respect to the pulleys 14 and 21 and pressing the discs 19 and 26 away from the discs 15 and 22, respectively.

Because of the differential connection between the shaft 10 and the discs 15 and 22, it will be quite clear that, if conditions tend to cause the belt 83 to lag behind the belt 84, the speed of rotation of the disc 15 may actually drop below that of the shaft 10; and, through the differential connection, the disc 22 will thereupon run slightly ahead of the shaft 10, to compensate for the conditions of inequality. It will be noted that the discs 19 and 26 are not keyed to the hubs 16 and 23, respectively, so that those discs are free, if necessary, to run at speeds slightly different from the speeds of their mates 15 and 22, respectively.

In the same way, if the belt 83 does lag behind the belt 84, the disc 59 will tend to lag behind the shaft 56, rotating under the influence of the disc 66; and the differential connection whereby the discs 59 and 66 are drivingly connected with the shaft 56 will nevertheless permit both pulleys 58 and 64 to participate in the transmission of driving force to said shaft. Here, again, it will be seen that the discs 63 and 65 are free for coaxial rotational movement relative to their respective mates 59 and 66.

While I have illustrated, and described in detail, a multiple belt drive of the expansible V-pulley type, it will be clear that many of the advantages of the differential connection between the shafts and the pulleys thereon will be attained during operation of the illustrated mechanism at a fixed setting; and that those same advantages would arise in a multiple V-belt transmission embodying pulleys of invariable effective diameters.

I presently believe that maximum efficiency will be attained in an organization of the character illustrated in Fig. 2, and that the structure of Fig. 2 will develop certain advantages not attained in the transmission illustrated in Fig. 1. In the transmission of Fig. 1, it will be noted the discs 19, 26, 63 and 65 have no driving connection with their respective shafts except through the belts and their mating discs, said mating discs being differentially connected to their respective shafts. Thus, in case the disc 15, for instance, should tend to run ahead of the disc 19, no driving force would be applied to the belt 83 directly through the disc 19. In the form of invention illustrated in Fig. 2, both discs of each of the pulleys will participate in the transmission of driving force from the input shaft to the output shaft.

In that form of invention, I have illustrated an input shaft 91 upon which is journalled a sleeve or shaft-like element 92, said sleeve being held against axial reciprocatory movement relative to the shaft 91 by means of an annular groove 93 formed in the shaft and receiving the reduced nose of a screw 94 penetrating the sleeve. A second sleeve or shaft-like element 95 is likewise journalled on the shaft 91, in axially spaced relation to the sleeve 92, said sleeve 95 being held against axial reciprocatory movement relative to the shaft 91 by means of a groove 96 in said shaft receiving the reduced nose of a screw 97 penetrating the sleeve 95.

A bevelled gear 98 is formed on that end of the sleeve 92 adjacent the sleeve 95 and a similar bevelled gear 99 is formed on the adjacent end of the sleeve 95. A planetary carrier 100 is fixed to rotate with the shaft 91, through the medium of a Woodruff key 101, and is interposed between the adjacent ends of the sleeves 92 and 95. Said carrier 100 is provided with one or more radially projecting fingers 102 upon which are journalled gears 103, carried eccentrically on the carrier 100, and said gears 103 mesh with the gears 98 and 99, as is clearly illustrated. The sleeves 92 and 95 are thus differentially connected to the shaft 91.

A first expansible V-pulley 104 is journalled on the sleeve 92. Said pulley comprises a coned disc 105 having an elongated coaxial hub 106 projecting from its coned face; and said disc bears, at its outer face, upon a shoulder 107 formed on the sleeve 92, whereby said disc is held against movement axially of the sleeve toward the left as viewed in the drawing. The pulley 104 comprises a mating coned disc 108 journalled on the hub 106 and free for coaxial reciprocatory movement relative to the disc 105. A hub 109 projects from the outer face of the disc 108 and at its distal end embodies a portion radially spaced from, and enshrouding, the distal end of the hub 106. An annular series of external teeth 110 is formed in the distal end of said hub; and an annular series of axially elongated teeth 111 is internally formed on the above-mentioned portion of the hub 109. A planetary carrier 112 is threadedly mounted on the distal end of the sleeve 92, and is held in fixed relation to said sleeve by a pointed set screw 113. Said carrier carries one or more stub axles 114, eccentrically arranged on the carrier, each of such axles supporting a gear 115 interposed between the toothed portions of the hubs 106 and 109 and meshing with the teeth 110 and the teeth 111 of said hubs. Thus, the discs 105 and 108 are differentially drivingly connected to the sleeve 92. A thrust bearing 116, similar to the bearing 35, is supported upon the hub 109; and it is to be understood that the disc 108 may be manipulated through said bearing 116, by means such as the lever 37 of Fig. 1, or other suitable shifting mechanism.

A second expansible V-pulley 117 is mounted on the sleeve 95, said pulley comprising a disc 118 having an elongated coaxial hub 119 projecting from its coned face and journalled on the sleeve 95. The rear or outer face of the disc 118 bears against a shoulder 120 on the sleeve 95 whereby said disc 118 is held against reciprocatory movement relative to the sleeve 95, toward the right as viewed in the drawings. The pulley 117 comprises, also, a mating disc 121 journalled on the hub 119 and free for reciprocatory movement relative thereto, toward and away from the disc 118. A hub 122 projects from the rear face of the disc 121, and embodies a portion which is radially spaced from, and enshrouds, the distal end of the hub 119. An annular series of teeth 123 is externally formed on the distal end of the hub 119, and an annular series of axially elongated teeth 124 is internally formed on the enshrouding portion of the hub 122. A planetary carrier 125 is secured to the distal end of the sleeve 95 to rotate therewith, by means of a pointed set screw 126, said carrier preferably being threaded upon said sleeve. The carrier 125 embodies one or more stub axles 127, eccentrically arranged on said carrier, and each of said axles carries a gear 128 interposed between the tooth series 123 and the tooth series 124, and meshing with both of said tooth series. Thus, the discs 118 and 121 are differentially drivingly connected with the sleeve 95. A bearing 129 is supported on the hub 122 and performs the functions of the bearing 45 of Fig. 1.

The transmission of Fig. 2 includes an output shaft 130 suitably supported upon an axis substantially parallel with the axis of shaft 91. A sleeve or shaft-like element 131 is journalled on the shaft 130 and is held against reciprocatory movement relative thereto by means of an annular groove 132 formed in said shaft and receiving the reduced nose of a screw 133 penetrating the sleeve 131. A further sleeve 134 is journalled on the shaft 130, in axial spaced relation to the sleeve 131, and is held against reciprocatory movement relative to said shaft by means of an annular groove 135 formed in the shaft and receiving the reduced nose of a screw 136 penetrating the sleeve 134. The adjacent ends of the sleeves 131 and 134 are axially spaced apart, and are formed, respectively, with bevelled gears 137 and 138. A planetary carrier 139 is mounted on the shaft 130, between the adjacent ends of the sleeves 131 and 134, and is fixed, by means of a Woodruff key 140, to rotate with said shaft 130. The carrier 139 embodies one or more radially projecting studs 141, upon each of which is mounted a bevelled gear 142, eccentric with respect to the shaft, said gears 142 meshing with the gears 137 and 138 to provide a differential driving connection between the shaft 130 and the sleeves 131 and 134.

A third expansible V-pulley, indicated generally by the reference numeral 143, is mounted on the sleeve 131. Said pulley 143 comprises a disc 144 having a coaxial, elongated hub 145 projecting from its coned face, and journalled on the sleeve 131. Said pulley comprises, also, a mating coned disc 146 journalled on the hub 145 and having a rearwardly projecting hub 147, the distal end of which is radially spaced from the distal end of the hub 145. The hub 145 is externally formed with an annular series of axially elongated teeth 148, and the enshrouding portion of the hub 147 is formed with an internal annular series of teeth 149. A planetary carrier 150 is threadedly mounted on the distal end of the sleeve 131 and is fixed thereto by means of a screw 151. A thrust bearing 152 is interposed between said carrier 150 and the adjacent end of the hub 147 of the disc 146 to restrain said disc against reciprocatory movement toward the right, as viewed in the drawing. Said carrier 150 embodies one or more stub axles 153, eccentrically arranged on said carrier, each of said axles carrying a gear 154 meshing with the teeth 148 and with the teeth 149. It will be clear that the disc 144 is free for reciprocatory movement relative to the sleeve 131 and to the shaft 130, whereby said disc may move toward and away from the mating disc 146 of the pulley 143.

A fourth expansible V-pulley, indicated generally by the reference numeral 155, is mounted on the sleeve 134. Said pulley 155 comprises a coned disc 156 having an elongated, coaxial hub 157 projecting from its coned face and journalled on the sleeve 134 for reciprocatory movement relative thereto. Said pulley further comprises a mating coned disc 158 journalled on the hub 157 and having a rearwardly projecting hub 159, the distal portion of which is radially spaced from the distal portion of the hub 157. An annular series of external teeth 160 is formed on the hub 157, said teeth being axially elongated for a reason which will appear; and the distal portion of the hub 159 is formed internally with an annular series of teeth 161 enshrouding the teeth 160. A planetary carrier 162 is threadedly supported upon the distal end of the sleeve 134 and is fixed to rotate therewith by means of a screw 163. A thrust bearing 164 is interposed between the carrier 162 and the adjacent end of the hub 159, whereby the disc 158 is restrained against reciprocatory movement toward the left, relative to the sleeve 134. The carrier 162 carries one or more eccentrically arranged stub axles 165, upon each of which is supported a gear 166 meshing with the teeth 160 and with the teeth 161.

It will be appreciated that the discs 144 and 156 are reciprocable, in the direction of the axis of the shaft 130, relative to the sleeves 131 and 134, with respect to which the carriers 150 and 162 are respectively fixed. The teeth 148 and the teeth 160 are, as stated, axially elongated so that the meshing engagement thereof with the gears 154 and 166, respectively, will be maintained throughout axial reciprocation of the discs 144 and 156.

A cylindrical shield 167 has an inturned toe 167' which bears against a shoulder 168 on the rear surface of the disc 144, and said shield cooperates telescopically with a shield element 169 having an inturned toe 170 bearing against a similar shoulder 171 on the disc 156. A coiled spring 172 is confined, under compression, between the inturned toes of the shield elements 167 and 169, a thrust bearing 173 preferably being interposed between one end of the spring 172 and the adjacent shield toe. It will be obvious that the spring 172 tends resiliently to force the discs 144 and 156 toward their respective mating discs 146 and 158.

A V-belt 174 provides a driving connection between the pulley 104 and the pulley 143; and a second V-belt 175 provides a driving connection between the pulley 117 and the pulley 155.

It will now be seen that the sleeves 92 and 95 are differentially drivingly connected to the shaft 91, and that the individual discs 105 and 108 of the pulley 104 are, in turn, differentially drivingly connected to the sleeve 92, while the individual discs 118 and 121 of the pulley 117 are differentially drivingly connected to the sleeve 95. Similarly, the sleeves 131 and 134 are differentially drivingly connected to the shaft 130; and the individual discs 144 and 146 are differentially drivingly connected to the sleeve 131, while the individual discs 156 and 158 of the pulley 155 are differentially drivingly connected to the sleeve 134. As a consequence of this arrangement, driving effort will be exerted by both discs of both pulleys on the input shaft, upon the belts 174 and 175, and driving effort will be transmitted to the shaft 130 by both discs of both pulleys 143 and 155, regardless of imperfections in the contours of the disc faces or in the cross-sectional contours of the belts. In other words, because of the differential driving connections illustrated in Fig. 2, the factors contributing to power losses in previously known structures of the multiple belt, expansible V-pulley transmission type, are compensated; and it has been found that the power-transmitting capacity of a transmission of the character illustrated in Fig. 2 corresponds quite closely to the theoretical capacity to be expected from an application of the empirical formula above-mentioned.

I claim as my invention:

1. A multiple V-pulley unit comprising a first coned disc, a mating coned disc mounted for coaxial rotation relative to said first coned disc, said discs cooperating to define a V-pulley, a third coned disc and a fourth coned disc mounted for coaxial rotation relative to said third coned disc, said third and fourth coned discs cooperating to define a second V-pulley, said discs being mounted for relative rotational movement about a common axis, means providing a differential driving connection between one disc of one of said pulleys and one disc of the other of said pulleys, and means enforcing rotation of said pulleys in a common direction.

2. A multiple V-pulley unit comprising a first coned disc, a second coned disc, said discs cooperating to define a V-pulley, a third coned disc disposed adjacent said first coned disc in back-to-back relation with the coned faces of said first and third discs directed away from each other, a fourth coned disc cooperating with said third coned disc to define a V-pulley, all of said discs being mounted for relative rotational movement about a common axis, means providing a differential driving connection between said first and third discs, and means enforcing rotation of said pulleys in a common direction.

3. A multiple V-pulley unit comprising a first coned disc, a second coned disc, said discs cooperating to define a V-pulley, a third coned disc disposed adjacent said first coned disc in back-to-back relation with the coned faces of said first and third discs directed away from each other, a fourth coned disc cooperating with said third coned disc to define a V-pulley, all of said discs being mounted for relative rotational movement about a common axis, bevelled gear means carried by said first and third discs, a planetary gear meshing with said bevelled gear means of both said discs, and means enforcing rotation of said pulleys in a common direction.

4. A multiple V-pulley unit comprising a first coned disc having an elongated, coaxial hub projecting from its coned face, a second coned disc mounted on said hub and cooperating with said first disc to define a V-pulley, a third coned disc mounted on said hub in back-to-back relation to said second disc and more remote from said first disc, a fourth coned disc mounted on said hub beyond said third disc and cooperating with said third disc to define a V-pulley, said second, third and fourth discs being mounted for rotational movement relative to said first disc and to each other, and means providing a differential drive connection between said first and fourth discs.

5. A multiple V-pulley unit comprising a first coned disc having an elongated, coaxial hub projecting from its coned face, a second coned disc mounted on said hub and cooperating with said first disc to define a V-pulley, a third coned disc mounted on said hub in back-to-back relation to said second disc and more remote from said first disc, a fourth coned disc mounted on said hub beyond said third disc and cooperating with said third disc to define a V-pulley, said second, third and fourth discs being mounted for rotational movement relative to said first disc and to each other, and gear means carried by said hub and by said fourth disc, and a planetary gear meshing with said gear means of said hub and with said gear means of said fourth disc.

6. A multiple V-pulley unit comprising a first shaft element, a second shaft element mounted for coaxial rotational movement relative to said first shaft element, a first coned disc mounted on said first shaft element, a second coned disc mounted for coaxial rotational movement relative to said first coned disc and cooperating therewith to define a V-pulley, means providing a differential driving connection between said discs, a third coned disc mounted on said second shaft element, a fourth coned disc mounted for coaxial rotational movement relative to said third coned disc and cooperating therewith to define a V-pulley, means providing a differential driving connection between said third and fourth discs, and means providing a differential driving connection between said first and second shaft elements.

7. A multiple V-pulley unit comprising a first shaft element, a second shaft element mounted for coaxial rotational movement relative to said first shaft element, a first coned disc mounted on said first shaft element for rotational movement relative thereto, a second coned disc mounted for coaxial rotational movement relative to said first coned disc and cooperating therewith to define a V-pulley, a carrier fixed to rotate with said first shaft element, gear means carried by said first and second discs, a planetary gear eccentrically carried by said carrier and meshing with said gear means of said first and second discs, a third coned disc mounted on said second shaft element for rotational movement relative thereto, a fourth coned disc mounted for coaxial rotational movement relative to said third coned disc and cooperating therewith to define a V-pulley, a second carrier fixed to rotate with said second shaft element, gear means carried by said third and fourth discs, a planetary gear eccentrically carried by said second carrier and meshing with said gear means of said third and fourth discs, and means providing a differential driving connection between said first and second shaft elements.

8. In combination, a shaft, a first coned disc mounted on said shaft for rotational movement relative thereto, a second coned disc mounted for coaxial rotational movement relative to said shaft and to said first disc and cooperating with said first disc to define a V-pulley, a third coned disc mounted on said shaft in back-to-back relation to said first disc and for rotational movement relative to said shaft and to said first disc with the coned faces of said first and third discs directed away from each other, a fourth coned disc mounted for coaxial rotational movement relative to said shaft and to said third disc and cooperating with said third disc to define a V-pulley, bevelled gear means carried by said first and third discs, a planetary carrier fixed to rotate with said shaft, interposed between said first and third discs, and eccentrically carrying a gear meshing with said bevelled gear means of said respective discs, and means enforcing rotation of said pulleys in a common direction.

9. In combination, a shaft, a first coned disc having an elongated, coaxial hub projecting from its coned face mounted on said shaft for rotational movement relative thereto, a second coned disc mounted on said hub and cooperating with said first disc to define a V-pulley, a third coned disc mounted on said hub in back-to-back relation to said second disc and more remote from said first disc, a fourth coned disc mounted on said hub beyond said third disc and cooperating with said third disc to define a V-pulley, said second, third and fourth discs being mounted for rotational movement relative to said first disc and to said shaft and each other, gear means carried by said hub and by said fourth disc, a planetary carrier fixed to rotate with said shaft, and a gear eccentrically carried by said carrier and meshing with said gear means of said hub and of said disc.

10. In combination, a shaft, a first sleeve journalled on said shaft, a second sleeve journalled on said shaft and axially spaced from said first sleeve, a first coned disc journalled on said first sleeve, a second coned disc mounted for coaxial rotational movement relative to said first sleeve and to said first disc and cooperating therewith to define a V-pulley, gear means carried by said first and second discs, a planetary carrier fixed to rotate with said first sleeve, a planetary gear eccentrically carried by said carrier and meshing with the gear means of said first and second discs, a third coned disc journalled on said second sleeve, a fourth coned disc mounted for coaxial rotational movement relative to said second sleeve and to said third disc and cooperating therewith to define a V-pulley, gear means carried by said third and fourth discs, a second planetary carrier fixed to rotate with said second sleeve, a planetary gear eccentrically carried by said second carrier and meshing with the gear means of said third and fourth discs, a third planetary carrier fixed to rotate with said shaft and interposed between said sleeves, gear means carried by said respective sleeves, and a gear eccentrically carried by said third carrier and meshing with the gear means of said respective sleeves.

11. In combination, a shaft, a first sleeve journalled on said shaft, a second sleeve journalled on said shaft and axially spaced from said first sleeve, a first coned disc journalled on said first sleeve and having a coaxially elongated hub projecting from its coned face, a second coned disc journalled on said hub and cooperating with said first disc to define a V-pulley, an annular series of teeth externally formed adjacent the distal end of said hub, a hub on said second disc projecting coaxially away from said first disc and having a distal region radially spaced from, and enshrouding, the tooth series of said first disc hub, an annular series of teeth internally formed on the enshrouding region of said second disc hub, a planetary carrier fixed to rotate with said first sleeve, a gear eccentrically carried by said carrier and disposed between, and meshing with, the teeth on said respective hubs, a third coned disc journalled on said second sleeve and having a coaxially-elongated hub projecting from its coned face away from said first disc, a fourth coned disc journalled on the hub of said third disc and cooperating with said third disc to define a V-pulley, an annular series of teeth externally formed adjacent the distal end of said third disc hub, a hub on said fourth disc projecting coaxially away from said third disc and having a distal region radially spaced from, and enshrouding, the tooth series of said third disc hub, an annular series of teeth internally formed on the enshrouding region of said fourth disc hub, a second planetary carrier fixed to rotate with said second sleeve, a gear eccentrically carried by said second carrier and disposed between, and meshing with, the teeth on the hubs of said third and fourth discs, gear means carried adjacent the adjacent ends of said sleeves, a third planetary carrier fixed to rotate with said shaft and disposed between said sleeve ends, and a gear eccentrically carried by said third carrier and meshing with said gear means of said sleeves.

12. A multiple V-pulley unit comprising a first coned disc, a mating coned disc mounted for coaxial reciprocatory and rotational movement relative to said first disc and cooperating therewith to define an expansible V-pulley, a third coned disc mounted in back-to-back relation to said first disc for coaxial rotational movement relative to said first disc, means restraining said first and third discs against relative axial reciprocatory movement, a fourth coned disc mounted for coaxial reciprocatory and rotational movement relative to said third disc and cooperating therewith to define an expansible V-pulley, means providing a differential driving connection between said first and third discs, and means enforcing rotation of said pulleys in a common direction.

13. A multiple V-pulley unit comprising a first coned disc, a second coned disc, said discs cooperating to define a V-pulley, a third coned disc and a fourth coned disc cooperating to define a second coned pulley, all of said discs being mounted for relative rotation about a common axis and one disc of each pulley being mounted for axial reciprocation toward and away from its fellow, means providing a differential driving connection between a disc of said first pulley and a disc of said second pulley, and means enforcing rotation of said pulleys in a common direction.

14. A multiple V-pulley unit comprising a first coned disc, a second coned disc, said discs cooperating to define a V-pulley, a third coned disc and a fourth coned disc cooperating to define a second coned pulley, all of said discs being mounted for relative rotation about a common axis and one disc of each pulley being mounted for axial reciprocation toward and away from its fellow, means restraining the other disc of said first pulley against axial movement relative to the other disc of said second pulley, means providing a differential driving connection between said last-named discs, and means enforcing rotation of said pulleys in a common direction.

15. A multiple V-pulley unit comprising a first coned disc having an elongated, coaxial hub projecting from its coned face, a second coned disc journalled on said hub for coaxial reciprocation relative to said first disc and cooperating with said first disc to define an expansible V-pulley, a third coned disc journalled on said hub for coaxial reciprocation relative to said first disc in back-to-back relation to said second disc and more remote from said first disc, a fourth coned disc journalled on said hub beyond said third disc and cooperating with said third disc to define an expansible V-pulley, means limiting axial movement of said fourth disc away from said first disc, spring means urging said second disc toward said first disc and said third disc away from said first disc, and means providing a differential driving connection between said first and fourth discs.

16. A multiple V-pulley unit comprising a first coned disc having an elongated, coaxial hub projecting from its coned face, a second coned disc journalled on said hub for coaxial reciprocation relative to said first disc and cooperating with said first disc to define an expansible V-pulley, a third coned disc journalled on said hub for coaxial reciprocation relative to said first disc in back-to-back relation to said second disc and more remote from said first disc, a fourth coned disc journalled on said hub beyond said third disc and cooperating with said third disc to define an expansible V-pulley, means limiting axial movement of said fourth disc away from said first disc, a coiled spring confined under compression between said second disc and said third disc, gear means carried by said hub, gear means carried by said fourth disc, and a planetary gear meshing with said gear means of said hub and with said gear means of said fourth disc.

17. A multiple V-pulley unit comprising a first shaft element, a second shaft element mounted for coaxial rotational movement relative to said first shaft element, a first coned disc mounted on said first shaft element, a second coned disc mounted for coaxial rotational and reciprocatory movement relative to said first coned disc and cooperating therewith to define an expansible V-pulley, means providing a differential driving connection between said discs, a third coned disc mounted on said second shaft element, a further coned disc mounted for coaxial rotational and reciprocatory movement relative to said third coned disc and cooperating therewith to define an expansible V-pulley, means providing a differential driving connection between said third and fourth discs, and means providing a differential driving connection between said first and second shaft elements.

18. A multiple V-pulley unit comprising a first shaft element, a second shaft element mounted for coaxial rotational movement relative to said first shaft element, a first coned disc journalled on said first shaft element, a second coned disc mounted for coaxial rotational and reciprocatory movement relative to said first coned disc and cooperating therewith to define an expansible V-pulley, a carrier fixed to rotate with said first shaft element, gear means carried by said first disc, gear means carried by said second disc, a planetary gear eccentrically carried by said carrier and meshing with said gear means of said first and second discs, a third coned disc journalled on said second shaft element, a fourth coned disc mounted for coaxial rotational and reciprocatory movement relative to said third coned disc and cooperating therewith to define an expansible V-pulley, a second carrier fixed to rotate with said second shaft element, gear means carried by said third disc, gear means carried by said fourth disc, a planetary gear eccentrically carried by said second carrier and meshing with said gear means of said third and fourth discs, and means providing a differential driving connection between said first and second shaft elements.

19. In combination, a shaft, a first coned disc journalled on said shaft, a second coned disc mounted for coaxial rotational and reciprocatory movement relative to said shaft and to said first disc and cooperating with said first disc to define an expansible V-pulley, a third coned disc journalled on said shaft in back-to-back relation to said first disc, a fourth coned disc mounted for coaxial rotational and reciprocatory movement relative to said third disc and cooperating with said third disc to define an expansible V-pulley, means restraining said first and third discs against relative reciprocatory movement, gear means carried by said first disc, gear means carried by said third disc, a planetary carrier fixed to rotate with said shaft and interposed between said first and third discs, a gear eccentrically carried by said carrier and meshing with said gear means of said first and third discs, and means enforcing rotation of said pulleys in a common direction.

20. In combination, a shaft, a first coned disc having an elongated, coaxial hub projecting from its coned face, said disc being journalled on said shaft, a second coned disc mounted on said hub for reciprocatory and rotational movement relative to said first disc and cooperating with said first disc to define an expansible V-pulley, a third coned disc mounted on said hub in back-to-back relation to said second coned disc for reciprocatory and rotational movement relative to said second disc and more remote from said first disc, spring means confined under compression between said second and third discs, a fourth coned disc journalled on said hub beyond said third disc and cooperating with said third disc to define an expansible V-pulley, gear means carried by said hub, gear means carried by said fourth disc, a planetary carrier fixed to rotate with said shaft, and a gear eccentrically carried by said carrier and meshing with said gear means of said hub and with said gear means of said fourth disc.

21. In combination, a shaft, a first sleeve journalled on said shaft, a second sleeve journalled on said shaft and axially spaced from said first sleeve, means restraining said sleeves against axial reciprocatory movement relative to said shaft, a first coned disc journalled on said first sleeve, a second coned disc mounted for coaxial rotational movement relative to said first sleeve and to said first disc, one of said discs being axially reciprocable relative to said first sleeve and said discs cooperating to define an expansible V-pulley, gear means carried by said first disc, gears means carried by said second disc, a planetary carrier fixed to rotate with said first sleeve, a planetary gear eccentrically carried by said carrier and meshing with the gear means of said first and second discs throughout relative axial reciprocation of said discs, a third coned disc journalled on said second sleeve, a fourth coned disc mounted for coaxial rotational movement relative to said second sleeve and to said third disc, one of said discs being axially reciprocable relative to said second sleeve and said third and fourth discs cooperating to define a second expansible V-pulley, gear means carried by said third disc, gear means carried by said fourth disc, a second planetary carrier fixed to rotate with said second sleeve, a planetary gear eccentrically carried by said second carrier and meshing with the gear means of said third and fourth discs throughout relative axial reciprocation of said discs, a third planetary carrier fixed to rotate with said shaft and interposed between said sleeves, gear means carried by said respective sleeves, and a gear eccentrically carried by said third carrier and meshing with the gear means of said respective sleeves.

22. A multiple V-belt drive comprising a first shaft, a first V-pulley journalled on said shaft, a second V-pulley journalled on said shaft, gear means carried by said first pulley, gear means carried by said second pulley, a planetary carrier fixed to rotate with said shaft, a gear eccentrically carried by said carrier and meshing with the gear means of said respective pulleys, a second shaft substantially parallel with said first shaft, a third V-pulley journalled on said second shaft, a fourth V-pulley journalled on said second shaft, gear means carried by said third pulley, gear means carried by said fourth pulley, a second planetary carrier fixed to rotate with said second shaft, a gear eccentrically carried by said second carrier and meshing with the gear means of said third and fourth pulleys, a V-belt providing a driving connection between said first and third pulleys, and a V-belt providing a driving connection between said second and fourth pulleys.

23. A multiple V-belt drive comprising a first shaft, a first coned disc journalled on said shaft, a second coned disc mounted for coaxial rotational movement relative to said shaft and to said first disc and cooperating with said first disc to define a first V-pulley, a third coned disc journalled on said shaft in back-to-back relation to said first disc, a fourth coned disc mounted for coaxial rotational movement relative to said shaft and to said third disc and cooperating with said third disc to define a second V-pulley, gear means carried by said first disc, gear means carried by said third disc, a planetary carrier fixed to rotate with said shaft and interposed between said first and third discs, a gear eccentrically carried by said carrier and meshing with said gear means of said first and third discs, a second shaft substantially parallel with said first shaft, a fifth coned disc journalled on said second shaft, a sixth coned disc mounted for coaxial rotational movement relative to said second shaft and to said fifth disc and cooperating with said fifth disc to define a third V-pulley, a seventh coned disc supported from said second shaft for coaxial rotational movement relative thereto, an eighth coned disc supported from said second shaft for coaxial rotational movement relative thereto and cooperating with said seventh disc to define a fourth V-pulley, gear means carried by said fifth disc, gear means carried by said eighth disc, a second planetary carrier fixed to rotate with said second shaft, a gear eccentrically carried by said second carrier and meshing with said gear means of said fifth and eighth discs, a V-belt providing a driving connection between said first and third pulleys, and a V-belt providing a driving connection between said second and fourth pulleys.

24. A multiple V-belt drive comprising a first shaft, a first coned disc journalled on said shaft, a second coned disc mounted for coaxial rotational movement relative to said shaft and to said first disc and cooperating with said first disc to define a first V-pulley, a third coned disc journalled on said shaft in back-to-back relation to said first disc, a fourth coned disc mounted for coaxial rotational movement relative to said shaft and to said third disc and cooperating with said third disc to define a second V-pulley, gear means carried by said first disc, gear means carried by said third disc, a planetary carrier fixed to rotate with said shaft and interposed between said first and third discs, a gear eccentrically carried by said carrier and meshing with said gear means of said first and third discs, a second shaft substantially parallel with said first shaft, a fifth coned disc having an elongated, coaxial hub projecting from its coned face journalled on said second shaft, a sixth coned disc mounted on said hub and cooperating with said fifth disc to define a third V-pulley, a seventh coned disc mounted on said hub in back-to-back relation to said sixth disc, an eighth coned disc journalled on said hub beyond said seventh disc and cooperating with said seventh disc to define a fourth V-pulley, gear means carried by said hub, gear means carried by said eighth disc, a second planetary carrier fixed to rotate with said second shaft, a gear eccentrically carried by said second carrier and meshing with said gear means of said hub and with said gear means of said eighth disc, a V-belt providing a driving connection between said first and third pulleys, and a V-belt providing a driving connection between said second and fourth pulleys.

25. A multiple V-belt drive comprising an input shaft, an output shaft, two coaxial V-pulleys mounted on said input shaft, each of said pulleys comprising a mating pair of coned discs mounted for rotational movement relative to each other and to said input shaft, a differential drive connection between said input shaft and one disc of each of the pulleys mounted thereon, two coaxial V-pulleys mounted on said output shaft, each of said last-named pulleys comprising a mating pair of coned discs mounted for rotational movement relative to each other and to said output shaft, a differential drive connection between said output shaft and one disc of each of the pulleys mounted thereon, a V-belt providing a drive connection between one of the pulleys on the input shaft and one of the pulleys on the output shaft, and a second V-belt providing a drive connection between the other of the pulleys on the input shaft and the other of the pulleys on the output shaft.

26. A multiple-belt, speed-varying drive comprising an input shaft, a first expansible V-pulley supported from said shaft, a second expansible V-pulley supported from said shaft, each pulley comprising a pair of mating, relatively rotational coned discs relatively movable in the direction of the axis of said shaft to vary the distance between the coned faces thereof, means providing a differential drive connection between said shaft and one disc of each of said pulleys, an output shaft, a third expansible V-pulley supported from said output shaft, a fourth expansible V-pulley supported from said output shaft, each pulley on said output shaft comprising a pair of mating, relatively rotational coned discs relatively movable in the direction of the axis of said output shaft to vary the distance between the coned faces thereof, means providing a differential drive connection between said output shaft and one disc of each of said third and fourth pulleys, a V-belt providing a drive connection between one of said pulleys on said input shaft and one of said pulleys on said output shaft, and a second V-belt providing a drive connection between the other of said pulleys on said input shaft and the other of said pulleys on said output shaft.

27. A multiple-belt, speed-varying drive comprising an input shaft, a first coned disc journalled on said shaft, a second coned disc mounted for coaxial reciprocatory movement relative to said shaft and to said first disc and cooperating with said first disc to define a first expansible V-pulley, a third coned disc journalled on said shaft in back-to-back relation to said first disc, a fourth coned disc mounted for coaxial reciprocatory movement relative to said shaft and to said third disc and cooperating with said third disc to define a second expansible V- pulley, means restraining said first and third discs against reciprocatory movement relative to said shaft, gear means carried by said first disc, gear means carried by said third disc, a planetary carrier fixed to rotate with said shaft and interposed between said first and third discs, a gear eccentrically carried by said carrier and meshing with said gear means of said first and third discs, means for controlling the axial positions of said second and fourth discs relative to said first and third discs, an output shaft substantially parallel with said input shaft, a fifth coned disc journalled on said output shaft, means restraining said fifth disc against reciprocatory movement relative to said output shaft, a sixth coned disc supported from said output shaft for reciprocatory movement toward and away from said fifth disc and cooperating with said fifth disc to define a third expansible V-pulley, a seventh coned disc supported from said output shaft in back-to-back relation to said sixth coned disc for reciprocatory movement toward and away from said fifth disc, an eighth coned disc supported from said output shaft for coaxial rotational movement relative to said output shaft and to said fifth disc and cooperating with said seventh disc to define a fourth expansible V-pulley, means restraining said eighth disc against axial movement away from said fifth disc, spring means confined under compression between said sixth and seventh discs and resiliently urging said sixth disc toward said fifth disc and said seventh disc toward said eighth disc, a second planetary carrier fixed to rotate with said output shaft, gear means carried by said fifth disc, gear means carried by said eighth disc, a gear eccentrically carried by said second carrier and meshing with the gear means of said fifth disc and with the gear means of said eighth disc, a V-belt providing a driving connection between said first and third pulleys, and a second V-belt providing a driving connection between said second and fourth pulleys.

28. A multiple-belt, speed-varying device comprising an input shaft, a first coned disc journalled on said shaft, a second coned disc mounted for coaxial reciprocatory movement relative to said shaft and to said first disc and cooperating with said first disc to define a first expansible V-pulley, a third coned disc journalled on said shaft in back-to-back relation to said first disc, a fourth coned disc mounted for coaxial reciprocatory movement relative to said shaft and to said third disc and cooperating with said third disc to define a second expansible V-pulley, means restraining said first and third discs against reciprocatory movement relative to said shaft, gear means carried by said first disc, gear means carried by said third disc, a planetary carrier fixed to rotate with said shaft and interposed between said first and third discs, a gear eccentrically carried by said carrier and meshing with said gear means of said first and third discs, means for controlling the axial positions of said second and fourth discs relative to said first and third discs, an output shaft substantially parallel with said input shaft, a fifth coned disc having an elongated, coaxial hub projecting from its coned face, said fifth disc being journalled on said output shaft, means restraining said fifth disc against reciprocatory movement relative to said output shaft, a sixth coned disc mounted on said hub for reciprocatory movement relative to said fifth disc and cooperating therewith to define a third expansible V-pulley, a seventh coned disc mounted on said hub in back-to-back relation to said sixth coned disc for reciprocatory movement toward and away from said fifth disc, an eighth coned disc mounted on said hub for coaxial rotational movement relative to said output shaft and to said fifth disc and cooperating with said seventh coned disc mounted for coaxial rotational movement relative to said second sleeve and to said third disc, one of said third and fourth discs being axially reciprocable relative to sad second sleeve and said third and fourth discs cooperating to define a second expansible V-pulley, means for controlling the positions of the axially reciprocable discs of said pulleys, gear means carried by said third disc, gear means carried by said fourth disc, a second planetary carrier fixed to rotate with said second sleeve, a gear eccentrically carried by said second carrier and meshing with the gear means of said third and fourth discs throughout relative axial reciprocation of said discs, a third planetary carrier fixed to rotate with said shaft and interposed between said sleeves, gear means carried by said respective sleeves, a gear eccentrically carried by said third carrier and meshing with the gear means of said respective sleeves, an output shaft substantially parallel with said input shaft, a third sleeve journalled on said output shaft, a fourth sleeve journalled on said output shaft and axially spaced from said third sleeve, means restraining said third and fourth sleeves against relative axial reciprocatory movement, a fifth coned disc journalled on said third sleeve, a sixth coned disc mounted for coaxial rotational movement relative to said third sleeve and to said fifth disc, one of said fifth and sixth discs being axially reciprocable relative to said third sleeve and said discs cooperating to define a third expansible V-pulley, gear means carried by said fifth disc, gear means carried by said sixth disc, a fourth planetary carrier fixed to rotate with said third sleeve, a gear eccentrically carried by said fourth carrier and meshing with the disc to define a fourth expansible V-pulley, means restraining said eighth disc against axial movement away from said fifth disc, spring means confined under compression between said sixth and seventh discs and resiliently urging said sixth disc toward said fifth disc and said seventh disc toward said eighth disc, a second planetary carrier fixed to rotate with said output shaft, gear means formed on the distal end of said hub externally thereof, internal gear means carried by said eighth disc and enshrouding the gear means on said hub in radially-spaced relation thereto, a gear eccentrically carried by said second carrier and disposed between, and meshing with, said gear means of said hub and said gear means of said eighth disc, a V-belt providing a driving connection between said first and third pulleys, and a second V-belt providing a driving connection between said second and fourth pulleys.

29. A multiple-belt, speed-varying drive comprising an input shaft, a first sleeve journalled on said shaft, a second sleeve journalled on said shaft and axially spaced from said first sleeve, means restraining said sleeves against relative axial reciprocatory movement, a first coned disc journalled on said first sleeve, a second coned disc mounted for coaxial rotational movement relative to said first sleeve and to said first disc, one of said discs being axially reciprocable relative to said first sleeve and said discs cooperating to define a first expansible V-pulley, gear means carried by said first discs, gear means carried by said first disc, gear means carried by said second disc, a first planetary carrier fixed to rotate with said first sleeve, a planetary gear eccentrically carried by said carrier and meshing with the gear means of said first and second discs throughout relative axial reciprocation of said discs, a third coned disc journalled on said second sleeve, a fourth gear means of said fifth and sixth discs throughout relative axial reciprocation of said discs, a seventh coned disc journalled on said fourth sleeve, an eighth coned disc mounted journalled on said fourth sleeve, an eighth coned disc mounted for coaxial rotational movement relative to said second sleeve and to said seventh disc, one of said seventh and eighth discs being axially reciprocable relative to said fourth sleeve and said seventh and eighth discs cooperating to define a fourth expansible V-pulley, means resiliently urging the discs of each of said third and fourth pulleys toward each other, gear means carried by said seventh disc, gear means carried by said eighth disc, a fifth planetary carrier fixed to rotate with said fourth sleeve, a gear eccentrically carried by said fifth carrier and meshing with the gear means of said seventh and eighth discs throughout relative axial reciprocation of said discs, a sixth planetary carrier fixed to rotate with said output shaft and interposed between said third and fourth sleeves, gear means carried by said third and fourth sleeves, respectively, a gear eccentrically carried by said sixth carrier and meshing with the gear means of said third and fourth sleeves, a V-belt providing a driving connection between said first and third pulleys, and a second V-belt providing a driving connection between said second and fourth pulleys.

References Cited in the file of this patent

UNITED STATES PATENTS

| | | |
|---|---|---|
| 1,727,232 | Farrell | Sept. 3, 1929 |
| 2,218,712 | Johnson | Oct. 22, 1940 |
| 2,410,915 | Willmott | Nov. 12, 1946 |

UNITED STATES PATENT OFFICE

Certificate of Correction

Patent No. 2,831,358                                                                    April 22, 1958

John S. Michie

It is hereby certified that error appears in the printed specification of the above numbered patent requiring correction and that the said Letters Patent should read as corrected below.

Column 11, line 71, for "further" read —fourth—; column 15, line 37, beginning with "28. A multiple-belt," strike out all to including "fourth pulleys." in column 18, line 2, comprising claims 28 and 29, and insert instead the following as claims 28 and 29:

28. A multiple-belt, speed-varying device comprising an input shaft, a first coned disc journalled on said shaft, a second coned disc mounted for coaxial reciprocatory movement relative to said shaft and to said first disc and cooperating with said first disc to define a first expansible V-pulley, a third coned disc journalled on said shaft in back-to-back relation to said first disc, a fourth coned disc mounted for coaxial reciprocatory movement relative to said shaft and to said third disc and cooperating with said third disc to define a second expansible V-pulley, means restraining said first and third discs against reciprocatory movement relative to said shaft, gear means carried by said first disc, gear means carried by said third disc, a planetary carrier fixed to rotate with said shaft and interposed between said first and third discs, a gear eccentrically carried by said carrier and meshing with said gear means of said first and third discs, means for controlling the axial positions of said second and fourth discs relative to said first and third discs, an output shaft substantially parallel with said input shaft, a fifth coned disc having an elongated, coaxial hub projecting from its coned face, said fifth disc being journalled on said output shaft, means restraining said fifth disc against reciprocatory movement relative to said output shaft, a sixth coned disc mounted on said hub for reciprocatory movement relative to said fifth disc and cooperating therewith to define a third expansible V-pulley, a seventh coned disc mounted on said hub in back-to-back relation to said sixth coned disc for reciprocatory movement toward and away from said fifth disc, an eighth coned disc mounted on said hub for coaxial rotational movement relative to said output shaft and to said fifth disc and cooperating with said seventh disc to define a fourth expansible V-pulley, means restraining said eighth disc against axial movement away from said fifth disc, spring means confined under compression between said sixth and seventh discs and resiliently urging said sixth disc toward said fifth disc and seventh disc toward said eighth disc, a second planetary carrier fixed to rotate with said output shaft, gear means formed on the distal end of said hub externally thereof, internal gear means carried by said eighth disc and enshrouding the gear means on said hub in radially-spaced relation thereto, a gear eccentrically carried by said second carrier and disposed between, and meshing with, said gear means of said hub and said gear means of said eighth disc, a V-belt providing a driving connection between said first and third pulleys, and a second V-belt providing a driving connection between said second and fourth pulleys.

29. A multiple-belt, speed-varying drive comprising an input shaft, a first sleeve journalled on said shaft, a second sleeve journalled on said shaft and axially spaced from said first sleeve, means restraining said sleeves against relative axial reciprocatory movement, a first coned disc journalled on said first sleeve, a second coned disc mounted for coaxial rotational movement relative to said first sleeve and to said first disc, one of said discs being axially reciprocable relative to said first sleeve and said discs cooperating to define a first expansible V-pulley, gear means carried by said first disc, gear means carried by said second disc, a first planetary carrier fixed to rotate with said first sleeve, a planetary gear eccentrically carried by said carrier and meshing with the gear means of said first and second discs throughout relative axial reciprocation of said discs, a third coned disc journalled on said second sleeve, a fourth coned disc mounted for coaxial rotational movement relative to said second sleeve and to said third disc, one of said third and fourth discs being axially reciprocable relative to said second sleeve and said third and fourth discs cooperating to define a second expansible V-pulley, means for controlling the positions of the axially reciprocable discs of said pulleys, gear means carried by said third disc, gear means carried by said fourth disc, a second planetary carrier fixed to rotate with said second sleeve, a gear eccentrically carried by said second carrier and meshing with the gear means of said third and fourth discs throughout relative axial reciprocation of said discs, a third planetary carrier fixed to rotate with said shaft and interposed between said sleeves, gear means carried by said respective sleeves, a gear eccentrically carried by said third carrier and meshing with the gear means of said respective sleeves, an output shaft substantially parallel with said input shaft, a third sleeve journalled on said output shaft, a fourth sleeve journalled on said output shaft and axially spaced from said third sleeve, means restraining said third and fourth sleeves against relative axial reciprocatory movement, a fifth coned disc journalled on said third sleeve, a sixth coned disc mounted for coaxial rotational movement relative to said third sleeve and to said fifth disc, one of said fifth and sixth discs being axially reciprocable relative to said third sleeve and said discs cooperating to define a third expansible V-pulley, gear means carried by said fifth disc, gear means carried by said sixth disc, a fourth planetary carrier fixed to rotate with said third sleeve, a gear eccentrically carried by said fourth carrier and meshing with the gear means of said fifth and sixth discs throughout relative axial reciprocation of said discs, a seventh coned disc journalled on said fourth sleeve, an eighth coned disc mounted for coaxial rotational movement relative to said second sleeve and to said seventh disc, one of said seventh and eighth discs being axially reciprocable relative to said fourth sleeve and said seventh and eighth discs cooperating to define a fourth expansible V-pulley, means resiliently urging the discs of each of said third and fourth pulleys toward each other, gear means carried by said seventh disc, gear means carried by said eighth disc, a fifth planetary carrier fixed to rotate with said fourth sleeve, a gear eccentrically carried by said fifth carrier and meshing with the gear means of said seventh and eighth discs throughout relative axial reciprocation of said discs, a sixth planetary carrier fixed to rotate with said output shaft and interposed between said third and fourth sleeves, gear means carried by said third and fourth sleeves, respectively, a gear eccentrically carried by said sixth carrier and meshing with the gear means of said third and fourth sleeves, a V-belt providing a driving connection between said first and third pulleys, and a second V-belt providing a driving connection between said second and fourth pulleys.

Signed and sealed this 24th day of June 1958.

[SEAL]

Attest:
KARL H. AXLINE,
Attesting Officer.

ROBERT C. WATSON,
Commissioner of Patents.